United States Patent Office 3,347,124
Patented Oct. 17, 1967

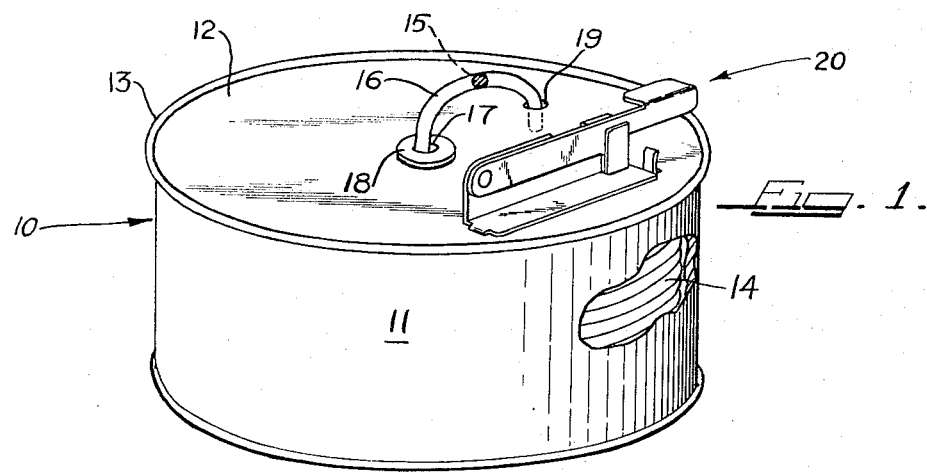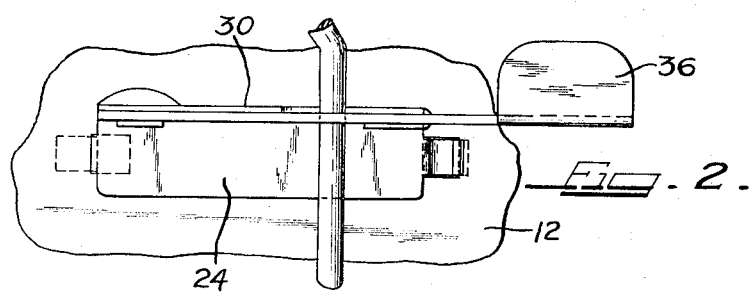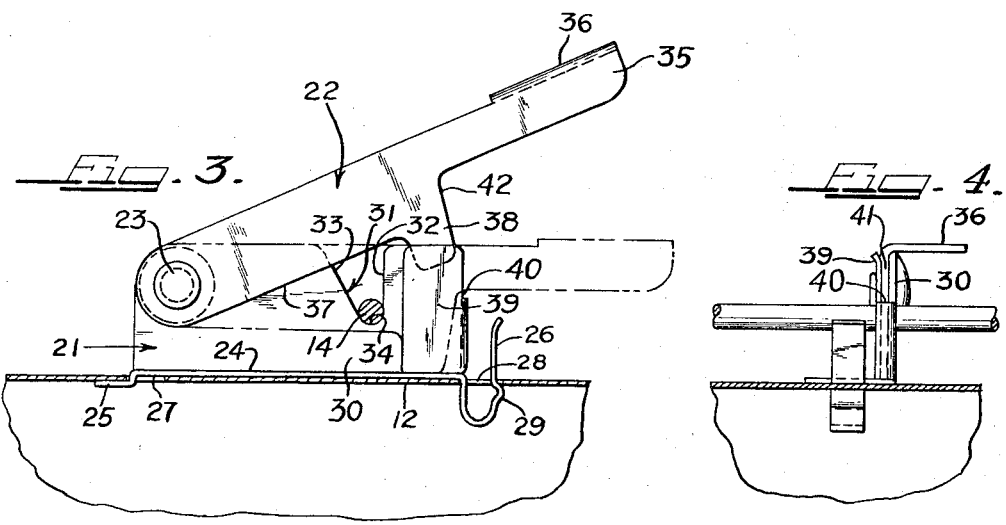
INVENTOR
STEVEN DOMENY
BY
Charles F. Voytech
Atty.

3,347,124
CUTTER FOR PACKING DISPENSER
Steven Domeny, Chicago, Ill., assignor to Crane Packing Company, Morton Grove, Ill., a corporation of Illinois
Filed Oct. 20, 1965, Ser. No. 498,846
5 Claims. (Cl. 83—609)

ABSTRACT OF THE DISCLOSURE

A cutter for a round or semi-round plastic packing, the cutter having a base adapted to be snapped into openings in the end of a container for the packing and the cutter itself comprising a manually operable knife pivotally mounted on the base and cooperating with a blade on the base to sever the packing.

Summary of invention

This invention relates to cutters for flexible packing material which are removably secured to containers for the material.

There is presently available on the market a rope-like material made of unsintered polytetrafluoroethylene which when wrapped around threads of a pipe or fastener, or when placed between mating faces of flanges or machine parts, or into a stuffing box, serves as a sealant and gasket material. It is sold in containers having metal ends and is packaged in said containers in helical form with one of the ends extending through a prepared central opening in one of the ends of the container so that a desirable length of the material can be withdrawn from the container and then cut off. The free end is inserted into a second opening in the end of the container disposed adjacent the central opening.

Unsintered polytetrafluoroethylene is somewhat difficult to tear, and since cutting tools are not always at hand at the moment the material is to be severed and used, it is desirable to furnish each container with a cutting device for this purpose. Since cutting devices are relatively expensive, it is desirable further that any such cutting device furnished with a container of the material shall be removable from an empty container and attachable to a container containing a fresh supply of the material. In my prior Patent No. 3,050,853 dated Aug. 28, 1962 for Tape Dispenser, there is disclosed a container for unsintered polytetrafluoroethylene material in tape form, the container being supplied with a removable cutter. The flat tape in the quantities or lengths sold occupies very little space and hence the container for the tape is a relatively small rectangular box. The cutter consequently is made to snap over one entire side of the box. The rope form of material to which this invention appertains is bulkier than flat tape and therefore requires a larger container and one of cylindrical, rather than rectangular form. The cutter for tape container therefore is not suitable for use with the rope form of material and it is accordingly an object of this invention to provide a removable cutter for rope-like material wherein the cutter may be secured to the disc-shaped end of a cylindrical container for the material.

It is a characteristic of unsintered polytetrafluoroethylene that it does not tear or break, but tends to stretch before severing. To avoid misshaping the rope-like material, the best severing action for it is a shearing action. However, the substantially round cross-section of the material makes difficult the retention of the material in a straight-bladed scissors during the cutting operation, and it is therefore another object of this invention to provide an inexpensive cutter for rope-like material which will hold the material against sliding along a blade during a shear-type cutting operation thereon.

It is also an object of this invention to provide a shear-type cutting device for rope-like material wherein the device is comprised of a minimum number of parts of stamped design to make the cost of the device as low as possible, consistent with an acceptable minimum life.

These and other objects of this invention will become apparent from the following detailed description of an illustrative preferred embodiment thereof when taken together with the accompanying drawings in which FIG. 1 is a plan view in prespective of a cylindrical container on which the cutter of this invention is shown mounted;

FIG. 2 is an enlarged fragmentary plan view of the cutter and of a portion of the top of the container;

FIG. 3 is a fragmentary side elevational view of the cutter and container of FIG. 2; and FIG. 4 is a fragmentary end elevational view of the cutter of FIG. 2.

Referring now to the drawings for a detailed description of the invention, there is shown in FIG. 1 a cylindrical container 10 which may be comprised of a tube 11 of cardboard, or the like, the ends of which are closed by sheet metal discs such as 12, the latter being secured to the tube ends by rolling the edge 13 of the disc 12 over the end of the tube 11. Within the container 10 is a coil 14 of unsintered polytetrafluoroethylene material which may have a cross-section of a width substantially equal to its height to give it a rope-like appearance. The cross-section may have a regular geometric form, such as a circle, square, hexagon, and the like, but for purposes of illustration it is shown as circular as at 15. Coil 14 has an end 16 which, during the filling of the container at the factory is threaded through an opening 17 disposed substantially centrally of the disc 12. The sharp edges of the opening are covered by a rubber grommet 18 to avoid undue scraping of and possible damage to, the material 14. To avoid having a loose end exposed to the exterior of the container which may be inadvertently withdrawn into the container and thereby made inaccessible from the exterior of the container, end 16 is inserted into a second opening 19 in the disc 12, leaving a simple loop which may be readily grasped by the user to pull out whatever length of the material he desires to use.

The cutter for the material 14 is shown at 20 mounted on metal disc 12, between rolled edge 13 and the grommeted central opening 18, so that the end 16 of the material may be pulled out of opening 19 and then swung into the cutter 20. The details of construction of the cutter are shown more clearly in FIGS. 2, 3, and 4. Said cutter is comprised of two stampings 21 and 22 pivoted together at 23. Stamping 21 is formed with a horizontal base 24 of substantially rectangular configuration formed with a stepped tab 25 at one end and a U-shaped spring clip 26 at the opposite end. Both the tab and clip are preferably made as integral parts of base 24 to avoid subsequent assembly operations. Tab 25 is inserted through an opening 27 in metal disc 12 under said disc as shown clearly in FIG. 3 and spring clip 26 is inserted in an opening 28 in metal disc 12. The opening is smaller than the normal extended distance across the clip 26 so that said clip must be compressed to enter said opening 28. A transversely disposed bead 29 on spring clip 26 is snapped through opening 28 and engages the under surface of disc 12 to hold the base 24 firmly against the upper surface of said disc 12.

Along one side of base 24 stamping 21 is bent upwardly at right angles to the base to form a vertical support 30 which has a notch 31 formed in the upper edge thereof. Said notch 31 has a substantially perpendicular edge 32, a sloping edge 33 and a curved bottom edge tangent to edges 32 and 33.

Stamping 22 is disposed immediately adjacent stamping 21 and is pivotally mounted on vertical support 30 at 23 as aforesaid. Said stamping 22 is similarly rectangular in shape, but at its forward end, the section, is relieved to form a handle 35, the upper portion of which is bent at right angles to the plane of stamping 22 to form a substantially flat thumb rest by which downward pressure is exerted upon stamping 22 to effect a cutting of the material 14. The bottom edge 37 of stamping 22 is substantially straight and is designed to pass across notch 31 and thereby provide with the edges of said notch a scissors action upon the material 14 to be cut off in the notch.

Because of the thinness of the material of which the stampings 21 and 22 are made, they are readily bent, and consequently any resistance to cutting offered by the material 14 will tend to bend the stampings away from one another to overcome the resistance. This, of course, defeats the purpose of the cutter and merely bends the material 14 instead of shearing it, as intended. This difficulty is overcome in the present novel design in the following manner:

The forward end of the pivoted stamping 22 has a downwardly extending tab 38 disposed immediately ahead of and coplanar with that portion of edge 37 which passes across notch 31. The forward portion 39 of the stationary stamping 31 and particularly of the vertical standard 30, has a notch 40 (FIG. 4) formed therein which is relatively narrow, and said forward end 39 is bent at notch 40 substantially 180° to form a slot 41 between vertical support 30 and its bent end 39 just wide enough to receive tab 38 and that portion of the pivoted stamping 22 immediately adjacent said tab.

As may be observed from FIG. 3, tab 38 enters slot 41 before there is any contact between the bottom edge 37 of stamping 22 and the material 14 to be sheared, so that as long as tab 38 remains in said slot 41, stamping 22 is held firmly against vertical support 30 and continues to be so held during the entire downward movement of the pivoted stamping 22. As the tab 38 is lowered, its forward edge 42 passes in very close proximity the bend at the notch 40 where the stamping is extremely rigid because of said bend. Thus, during the critical movement of the edge 37 through the material 14, it is firmly held against the edges of the notch 31 and a clean shearing action results.

To cut off a desired length of the material 14 the user pulls the end 16 of the material out of the container 10 until the desired length has been extracted, and he then raises handle 35 until notch 38 is free of the vertical standard 30 and the material can be inserted under the tab 38 and into notch 31. He then lowers handle 35 which first causes tab 38 to enter the slot 41, and he then continues the downward movement of the handle 35 until tab 38 contacts the horizontal base 24. As shown in the dot-dash lines, when this occurs the bottom edge 37 of stamping 22 has passed beyond the curved bottom edge 34 of notch 31 and the piece has been severed. The new end of the material 14 is then inserted into opening 19 until the material is again needed. During the raising and lowering of handle 35 the cutter 20 is held firmly in place by tab 25 and spring clip 26 on the sheet metal disc 12 forming the end of the container 10.

When said container 10 is empty, a new container may be obtained without the cutter 20, however, and said cutter 20 is then transferred from the empty container to the new one by closing spring clip 26 until the transverse bead 29 can be raised through opening 28, at which point the forward part of the cutter 20 is then raised until spring clip 26 is entirely free of opening 28. Next the cutter is moved forwardly and upwardly to pull stepped tab 25 out of opening 27 to free cutter 20 completely from sheet metal disc 12. Said cutter is then applied to the new container in the reverse order, that is, stepped tab 25 is first inserted into opening 27 and spring clip 26 is closed sufficiently to allow bead 29 to pass through opening 28 whereupon the spring clip 26 is released and the cutter is again firmly in place.

Thus by an appropriate forming and bending of the two pieces of sheet metal and the subsequent joining of these two pieces through a pivoted connection, a cutter having a scissor action is produced for substantially round material. The relatively thin sheet metal is strengthened and guided where necessary and the cutter is provided with integral spring-biased holding means for removably attaching it to and holding it on a container. Thus the cutter may be used indefinitely by transferring it from one container to another, provided the new container has appropriately spaced and sized openings to accept tab 25 and spring clip 26.

Although the invention has been described with reference to its application to polytetrafluoroethylene material, it is understood that it may be used with other materials with equal facility. It is also understood that the material may be a single strand, or it may be a plurality of strands twisted or braided together to form a single coherent rope. It may also be understood that while base 24 has been described as rectangular, it may have other configurations. Similarly, the location of tab 25 and spring clip 26 is described as at the ends of base 24, but they may have other locations on the base. The foregoing description thus is intended to illustrate a preferred embodiment of the invention, and the scope of the invention is not to be limited thereto, but is to be determined by the appended claims.

I claim:

1. In combination, a container for rope-like material and a cutter mechanism for cutting said material, said container having a hard sheet material top, said top having an opening therein through which an end of said material extends, said cutter mechanism comprising a metal sheet bent to form an elongated base and an upstanding support, a metal knife pivoted on said upstanding support in close proximity to said support and forming with an edge of said support a scissors, and an extension on said base sheet bent in the form of a spring clip, said sheet material top having an opening to receive said clip to secure said cutter to said container, said support having one end folded upon itself, and said knife being slidably retained between the fold and support while it is cutting said material.

2. In combination, a container for rope-like packing material and a cutter mechanism for cutting said material, said container having a hard sheet material top, said top having an opening therein through which an end of said packing material extends, said cutter mechanism comprising a metal sheet bent to form an elongated base and an upstanding support in close proximity to said support and forming with an edge of said support a scissors, a spring clip formed on said base, said sheet material top having an opening to receive said clip to secure said cutter to said container, and means for guiding said knife along said support, said means comprising a portion of said support bent through substantially 180° with said support to form a slot, and said knife having an extension adapted to be received in and guided by said slot.

3. A cutter mechanism for rope-like material comprising a fixed support and a movable knife cooperating with said support to provide a scissor-type cutting action, said fixed support comprising a sheet metal stamping forming a flat base, a side bent upwardly from said base at right angles thereto, a first notch in the side to receive the material to be cut, a second notch in the side, the forward end of said side being bent at the said second notch at substantially 180° from said side and spaced therefrom a distance substantially equal to the thickness of the adjacent part of said knife, and means integral with the base for securing the base to a container or the like.

4. A cutter mechanism as described in claim 3, said last-mentioned means comprising a laterally extending tab on one edge of the base adapted to be received in an opening in a container, and a laterally biased spring clip on an edge of the base opposite the said one edge and adapted to be received in another opening in said container.

5. A cutter mechanism as described in claim 4, said spring clip comprising a U-shaped tab, and a bead on one leg of the U adapted to pass through the opening upon compression of the clip and to resist withdrawal of the clip from the opening.

References Cited

UNITED STATES PATENTS

| 2,263,466 | 11/1941 | McCarthy | 83—607 X |
| 2,603,861 | 7/1952 | Bartlett | 83—648 X |
| 2,605,542 | 8/1952 | Upton | 83—648 X |
| 2,894,241 | 7/1959 | McKee | 248—223 X |

FOREIGN PATENTS

| 75,972 | 7/1961 | France. |
| 1,332,729 | 6/1963 | France. |

WILLIAM W. DYER, JR., *Primary Examiner.*

JAMES M. MEISTER, *Examiner.*